United States Patent
Kailey et al.

(10) Patent No.: US 9,742,959 B1
(45) Date of Patent: Aug. 22, 2017

(54) MECHANISM FOR COLOR MANAGEMENT CACHE REINITIALIZATION OPTIMIZATION

(71) Applicants: Walter F. Kailey, Broomfield, CO (US); Vincent William Ferreri, Frederick, CO (US)

(72) Inventors: Walter F. Kailey, Broomfield, CO (US); Vincent William Ferreri, Frederick, CO (US)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 15/052,148

(22) Filed: Feb. 24, 2016

(51) Int. Cl.
| | |
|---|---|
| H04N 1/60 | (2006.01) |
| G06K 15/02 | (2006.01) |
| G06F 3/12 | (2006.01) |
| G06F 12/08 | (2016.01) |
| G06F 17/30 | (2006.01) |
| G06F 12/0891 | (2016.01) |
| G06F 12/0864 | (2016.01) |

(52) U.S. Cl.
CPC ........... *H04N 1/6019* (2013.01); *G06F 3/122* (2013.01); *G06F 3/1211* (2013.01); *G06F 3/1247* (2013.01); *G06F 12/0864* (2013.01); *G06F 12/0891* (2013.01); *G06F 17/3033* (2013.01); *G06K 15/1802* (2013.01); *G06K 15/1827* (2013.01); *G06K 15/1878* (2013.01)

(58) Field of Classification Search
None
See application file for complete search history.

(56) References Cited

U.S. PATENT DOCUMENTS

| | | | |
|---|---|---|---|
| 5,870,077 A | 2/1999 | Dillinger et al. | |
| 5,963,201 A | 10/1999 | McGreggor et al. | |
| 6,075,514 A * | 6/2000 | Ryan | H04N 1/6019 345/601 |
| 6,115,802 A * | 9/2000 | Tock | G06F 12/0806 707/999.001 |
| 6,239,829 B1 * | 5/2001 | Curry | H04N 1/40037 347/251 |
| 6,728,398 B1 * | 4/2004 | Hondl | G06T 11/001 358/518 |
| 6,990,232 B2 | 1/2006 | Ohga | |
| 7,020,658 B1 * | 3/2006 | Hill | G06F 17/30067 |
| 7,443,544 B2 * | 10/2008 | Waksman | H04N 1/6016 358/3.01 |
| 7,564,466 B2 | 7/2009 | Quach | |
| 8,102,569 B1 | 1/2012 | Goel et al. | |

(Continued)

OTHER PUBLICATIONS

Hill, Mark D. et al., "Evaluating Associativity in CPU Caches", IEEE Transactions on Computers, vol. 38, No. 12, Dec. 1989, pp. 1612-1630.

(Continued)

*Primary Examiner* — Scott A Rogers
(74) *Attorney, Agent, or Firm* — Alpine Technology Law Group, LLC (57) ABSTRACT

A printing system is disclosed. The printing system includes a color management unit having a hash table to store input colors and corresponding output colors and a lookup table (LUT). The printing system also includes one or more processors to reinitialize the hash table based on a hash table time and a interpolation time derived from concurrent real time measurements.

18 Claims, 6 Drawing Sheets

(56) References Cited

U.S. PATENT DOCUMENTS

| | | | | |
|---|---|---|---|---|
| 8,806,175 B2* | 8/2014 | Beaman | ............. | G06F 17/3033 |
| | | | | 711/208 |
| 8,870,319 B2* | 10/2014 | Maltz | ................... | H04N 1/6033 |
| | | | | 347/14 |
| 8,924,663 B2* | 12/2014 | Szczepkowski | ...... | G06F 3/0608 |
| | | | | 711/103 |
| 2006/0268298 A1* | 11/2006 | Wali | .................... | H04N 1/6058 |
| | | | | 358/1.9 |
| 2014/0108362 A1* | 4/2014 | Kim | ................... | H03M 7/3084 |
| | | | | 707/693 |

OTHER PUBLICATIONS

Chilimbi, Trishul M. et al., "Cache-Conscious Data Structures", ACM Sigplan Notices, (34)5, 1999, pp. 13-24.

* cited by examiner

MECHANISM FOR COLOR MANAGEMENT CACHE REINITIALIZATION OPTIMIZATION

FIELD OF THE INVENTION

The invention relates to the field of printing systems, and in particular, to color management workflow.

BACKGROUND

Growth in color management has resulted in an increase in software packages that are used to generate International Color Consortium (ICC) profiles. ICC profiles describe color attributes of a particular device or viewing requirement by defining mappings between a device color space and device independent color space. Typically, profiles created by a standard organization, e.g., International Organization for Standardization (ISO) are selected as printer input profiles when printing cyan, magenta, yellow, black (CMYK) print jobs.

Color management performs a multi-dimensional interpolation of an input color within a high-dimensional Look Up Table (LUT). Such LUT interpolations are often processor intensive. Thus, a common technique is to cache converted colors for later use. Implementation of an open-addressed hash table (or cache) is typically the most efficient means of color caching. However when the number of stored entries in the table becomes excessively large, hash collisions tend to increase. The increase in hash collisions result in the total time spent searching the cache (e.g., for both stored and un-stored) colors becoming comparable to, or even exceeding, the time it would take to simply perform a LUT interpolation.

Reinitializing the hash table can mitigate this problem. However, determining the optimal time to reinitialize the hash table is a challenge. Moreover, individual entries cannot be removed from the hash table once being added. Thus, the entire table must be erased and reinitialized (or reset). As a result, reinitializing should only be performed when necessary. Current mechanisms reinitialize the hash table when a predetermined fixed percentage of the table size is used up. This percentage directly determines an average number of hash collisions that occur when a color is looked up, but does not directly indicate whether beneficial to reinitialize the hash table and start over.

Accordingly, an improved mechanism to optimize hash table reinitialization is desired.

SUMMARY

In one embodiment, a printing system is disclosed. The printing system includes a color management unit having a hash table to store input colors and corresponding output colors and a lookup table (LUT). The printing system also includes one or more processors to reinitialize the hash table based on a hash table time and a interpolation time derived from concurrent real time measurements.

In a further embodiment, a method is disclosed including reinitializing a color management hash table based on a calculated exponential average.

BRIEF DESCRIPTION OF THE DRAWINGS

A better understanding of the present invention can be obtained from the following detailed description in conjunction with the following drawings, in which.

DETAILED DESCRIPTION

An improved mechanism to optimize hash table reinitialization is described. In the following description, for the purposes of explanation, numerous specific details are set forth to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
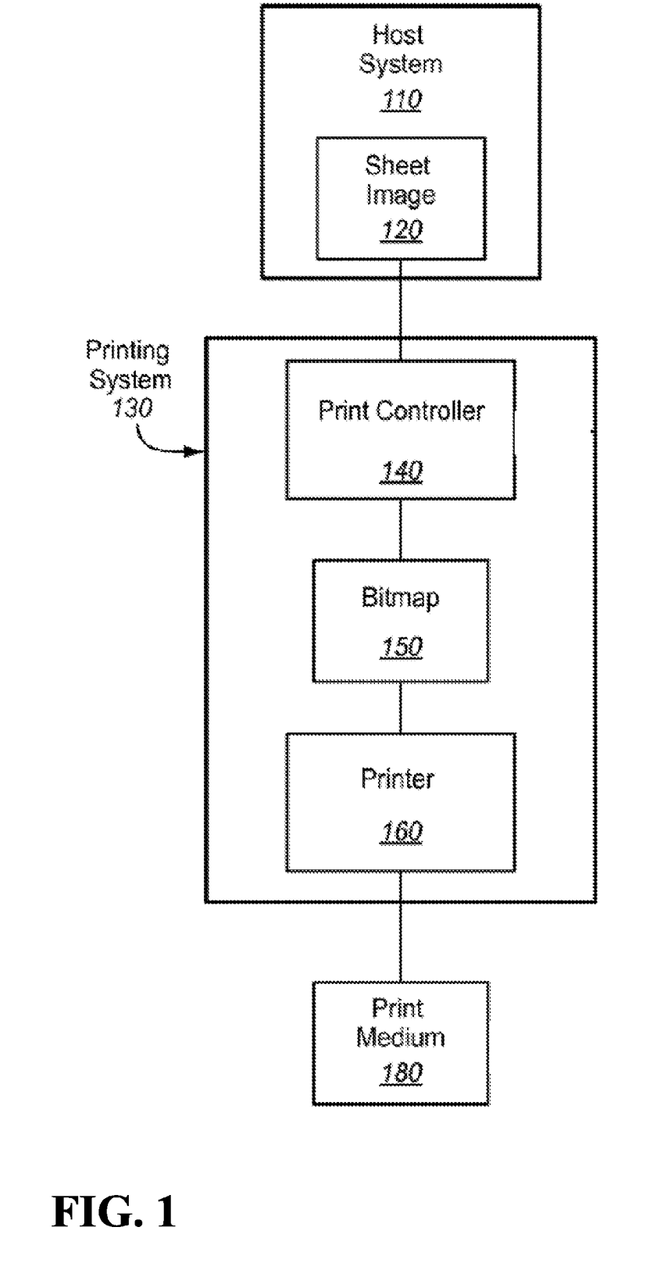
FIG. 1 is a block diagram of one embodiment of a printing system.

FIG. 1 is a block diagram illustrating one embodiment of a printing system 130. A host system 110 is in communication with the printing system 130 to print a sheet image 120 onto a print medium 180 (e.g., paper) via a printer 160. The resulting print medium 180 may be printed in color and/or in any of a number of gray shades, including black and white (e.g., Cyan, Magenta, Yellow, and blacK, (CMYK)). The host system 110 may include any computing device, such as a personal computer, a server, or even a digital imaging device, such as a digital camera or a scanner.

The sheet image 120 may be any file or data that describes how an image on a sheet of print medium 180 should be printed. For example, the sheet image 120 may include PostScript data, Printer Command Language (PCL) data, and/or any other printer language data. The print controller 140 processes the sheet image to generate a bitmap 150 for printing to the print medium 180 via the printer 160. The printing system 130 may be a high-speed printer operable to print relatively high volumes (e.g., greater than 100 pages per minute). The print medium 180 may be continuous form paper, cut sheet paper, and/or any other tangible medium suitable for printing. The printing system 130, in one generalized form, includes the printer 160 that presents the bitmap 150 onto the print medium 180 (e.g., via toner, ink, etc.) based on the sheet image 120.

The print controller 140 may be any system, device, software, circuitry and/or other suitable component operable to transform the sheet image 120 for generating the bitmap 150 in accordance with printing onto the print medium 180. In this regard, the print controller 140 may include processing and data storage capabilities.

Figure 2:
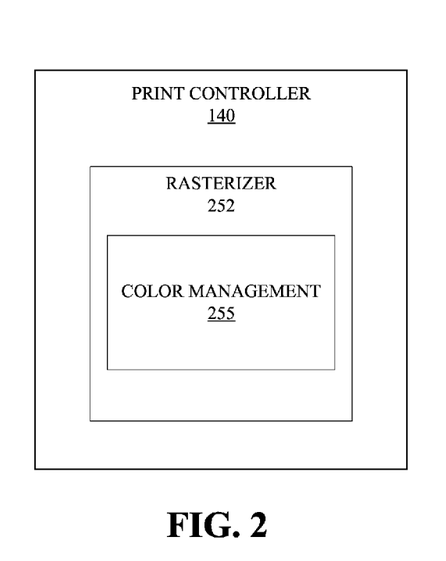
FIG. 2 is a block diagram of one embodiment of a print controller.

FIG. 2 is a block diagram illustrating one embodiment of a print controller 140. The print controller 140 (e.g., DFE or digital front end), in its generalized form, includes a rasterizer 252 to generate bitmap 150. Rasterizer 152 includes a color management unit 255 that provides a color mapping from an input color space to a printer 160 color space. In one embodiment, color management unit 210 uses ICC profiles to perform a color managed workflow by mapping to determine CMYK values for each pixel in a particular object to be printed at printer 160.

Figure 3:
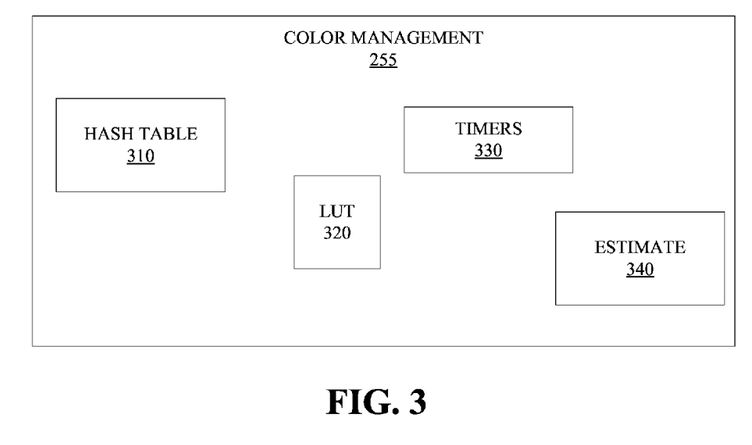
FIG. 3 illustrates one embodiment of a color management unit.

FIG. 3 is a block diagram illustrating one embodiment of a color management unit 255. Color management unit 255 includes hash table 310, color lookup table (LUT) 320 and timers 330. In one embodiment, print controller 140 performs a lookup of hash table 310 upon receiving an input color to determine if the input color is included in hash table 310 with a corresponding output color. If so, the output color is provided for the color management workflow.

However if there is no entry in hash table 310, LUT 320 is implemented to perform a multi-dimensional interpolation in order to generate the output color. Thus, the input color and the resulting output color are stored as an entry in hash table 310. As discussed above, the interpolation is computationally expensive.

As previously mentioned, hash collisions may arise as hash table 310 fills up, leading to longer hash lookup times. Periodically clearing hash table 310 mitigates hash collisions. However this clearing comes at the cost of reinitializing the table. Therefore when hash table 310 is cleared, cache lookup is fast. However there are few hits in the hash table, which results in more time spent doing interpolation LUT 320 and re-populating the table 310.

LUT times may depend on the size of the LUT 320, the location of the lookup color within the space, and other factors specific to LUT 320, whereas hash times depend on the number of hash collisions. Accordingly, there is currently no way to know when the best time is to reset the hash table. For instance, resetting based on table "fullness" does not produce the optimal result, and tracking individual times is too noisy.

Figure 4:
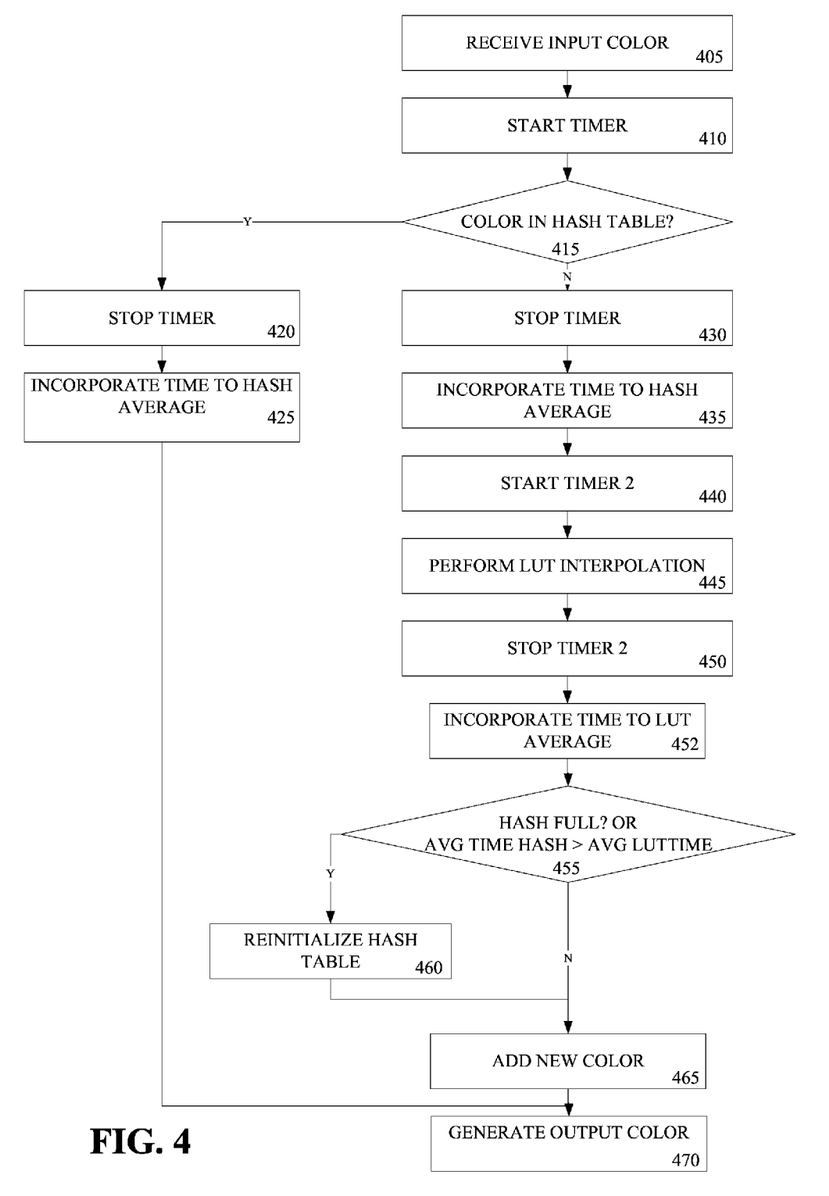
FIG. 4 is a flow diagram illustrating one embodiment of a cache reinitialization process.

According to one embodiment, print controller 140 reinitializes hash table 310 based on a exponential running average (also known as exponential moving average) calculated by $x_{average} = \alpha \cdot x + (1-\alpha) \cdot x_{average}$, where a controls how responsive the average is (e.g., how well individual times are tracked). In other embodiments, other types of moving averages may be used. In such an embodiment, timers 330 are implemented to calculate average hash times and average LUT times. Thus, hash table 310 is reinitialized when the average hash time exceeds the average LUT time. Based on the process, the details of the colors being processed are derived from measurements performed concurrently in real time. Those details dictate when the reinitialization occurs, rather than a hard-coded "fullness" determination FIG. 4 is a flow diagram illustrating one embodiment of a cache reinitialization process. At processing block 405, an input color is received at color management unit 255. At processing block 410, a timer within timers 330 is started. At decision block 415, a determination is made as to whether the input color is in hash table 310. If so, the timer is stopped, processing block 420, and the time to perform the hash is incorporated into the average time to search the hash table (hash average), processing block 425. At processing block 470, the output color is generated.

If at processing block 415, a determination is made that the input color is not in the hash table 310, the timer is stopped, processing block 430, and the time to perform the hash is incorporated into the hash average, processing block 435. At processing block 440, a second timer within timers 330 is started. At processing block 445, a multi-dimensional interpolation is performed at LUT 320. At processing block 450, the second timer is stopped. At processing block 452, the time to perform the LUT is incorporated into the average time to perform the interpolation (LUT average).

At decision block 455, a determination is made as to whether the hash is full, or whether the average hash time is greater than the average LUT time. If neither condition is met, the new color is added to hash table 310, processing block 465. At processing block 470, the output color is generated. Otherwise, hash table 310 is reinitialized at processing block 460 prior to adding the new color at processing block 465. When hash table 310 is reinitialized, the hash time average and LUT time averages may be reset to zero or other default values.

The above-described process provides superior adaptation to data-dependent scenarios. For instance, a reset occurs to prevent slowed processing when the hash table is not full, but a particular color has a large number of collisions and happens to be repeated often in the input data. Further, needless reset is avoided if the hash table becomes full but the frequently repeated colors in the image have few collisions.

In another embodiment, color management unit 255 includes an estimation unit 340 to calculate a refined estimate of hash collision processing time, interpolation time, and overhead processing time for a batch of colors. In such an embodiment, timers 330 track a total processing time for each color, whether or not a cache hit occurs. Thus, precision timing of sub-processes is avoided, resulting in more precise measurement with less computational overhead.

According to one embodiment, estimation unit 340 estimates a probability ($f_i$) that interpolation processing is required (e.g., probability of a cache miss) for incoming colors. In one embodiment, $f_i$ is estimated as the fraction of colors interpolated since the last hash table 310 reset. In a further embodiment, the average number of hash table collisions per color processed is $\langle n_{coll} \rangle = f/(1-f)$ when hash table 310 fullness fraction is f. Fullness fraction f is the ratio of table entries used to the size of the table and is calculated or tracked through conventional methods. The optimal fullness for hash table 310 reset is determined by $f_i\beta + \langle n_{coll} \rangle \gamma = \beta$, where $\beta$ is the interpolation processing time and $\gamma$ is the hash table collision time.

Figure 5:
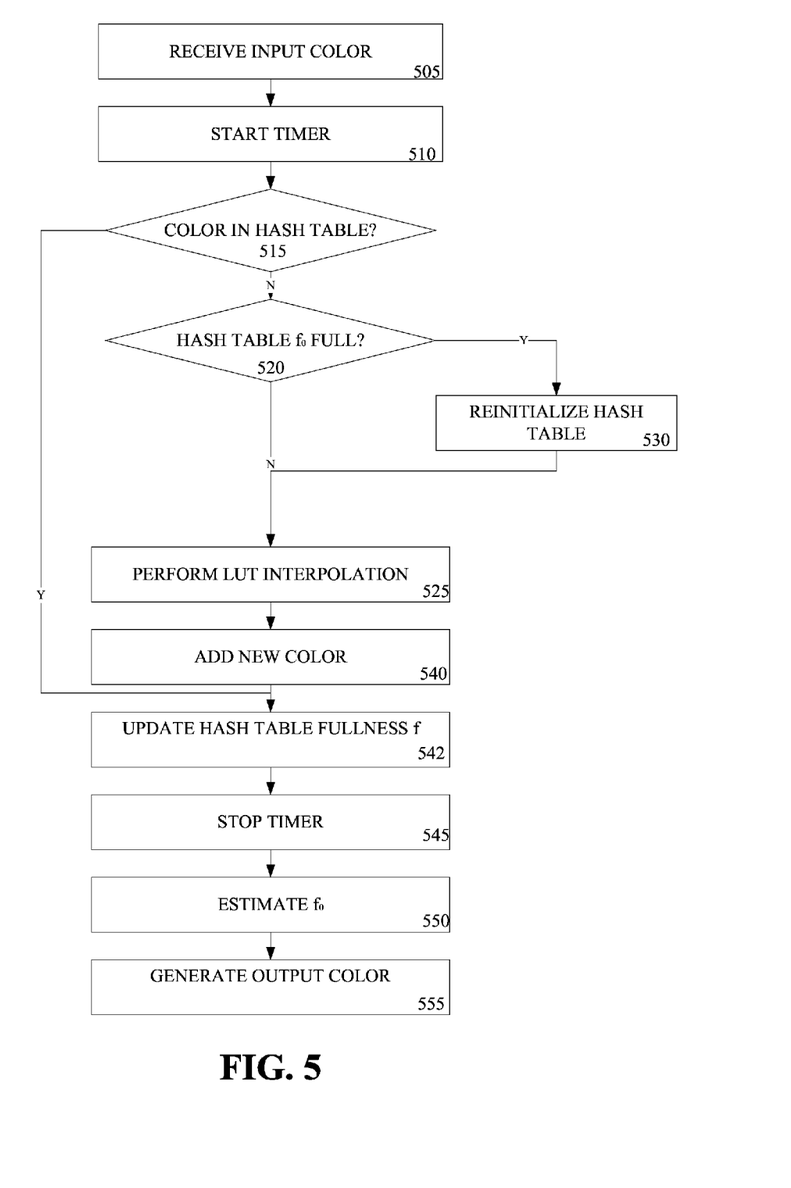
FIG. 5 is a flow diagram illustrating another embodiment of a cache reinitialization process.

FIG. 5 is a flow diagram illustrating one embodiment of a cache reinitialization process. At processing block 505, an input color is received at color management unit 255. At processing block 510, a timer is started. At decision block 515, a determination is made as to whether the input color is in hash table 310. If not, a determination is made as to whether hash table 310 fullness factor f has reached an optimal fullness ($f_0$).

If it is determined that hash table 310 is not $f_0$ full, a multi-dimensional interpolation is performed at LUT 320, processing block 525. If it is determined that hash table 310 is a fraction $f_0$ full, hash table 310 is reinitialized, processing block 530, prior to performing the interpolation. At processing block 540, the new color is added to hash table 310. At processing block 542, a hash table 310 fullness (f) is updated. In one embodiment, hash table fullness is calculated based upon a number of entries in hash table 310 divided by the size of the table 310.

At processing block 545, the timer is stopped. At processing block 550, $f_0$ is estimated. At processing block 555, the output color is generated. If at decision block 515 a determination is made that the color is in hash table 310, control proceeds directly to processing block 545, where the timer is stopped. Subsequently, $f_o$ is estimated (processing block 550) and the output color is generated (processing block 555).

Figure 6:
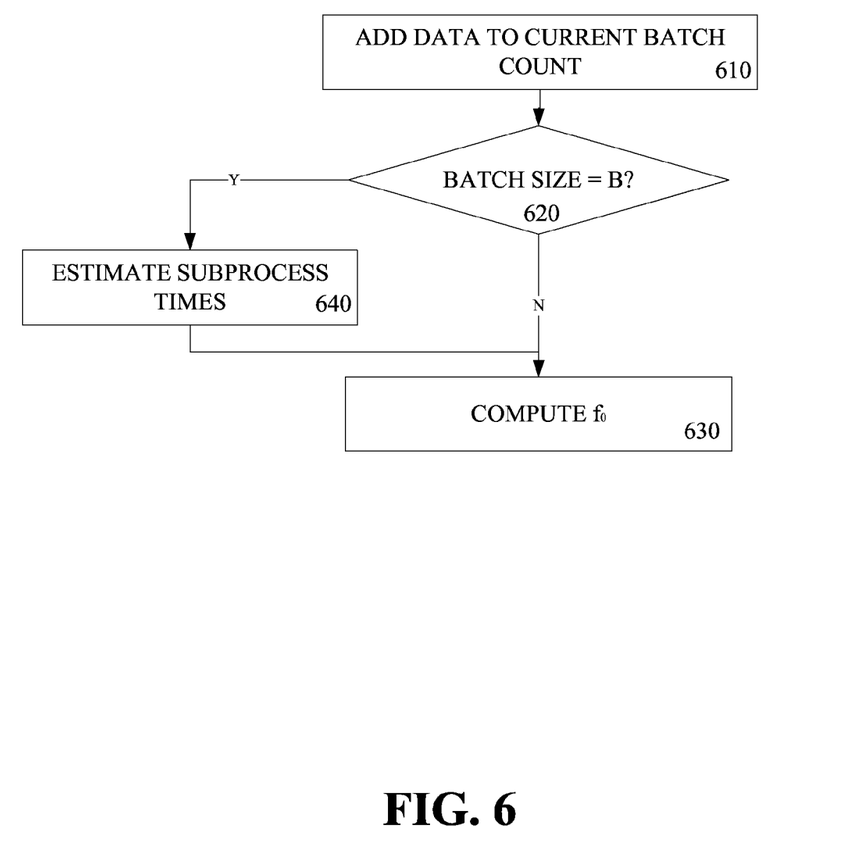
FIG. 6 is a flow diagram illustrating one embodiment of estimating optimal cache fullness and FIG. 7 illustrates one embodiment of a computer system.

FIG. 6 is a flow diagram illustrating one embodiment of a process to estimate the optimal cache fullness $f_0$ at which to reset the cache. At processing block 610, processing time, hash table 310 collision count and interpolation count are updated for the current batch. At decision block 620, a determination is made as to whether a batch size has been reached (e.g., does the new color fill the batch). In one embodiment, the batch includes 32 colors. However other embodiments may feature other quantities of colors.

If it is determined that the color does fill the batch, $f_0$ is computed from a process model, processing block 630. Otherwise the prior estimate of $f_0$ is used. In one embodiment, optimal fullness occurs when $$f_i \beta + \langle n_{coll} \rangle \gamma = \beta$$

Further, the average number of collisions is related to the current fullness fraction f as $\langle n_{coll} \rangle = f/(1-f)$. Therefore the optimal fullness fraction for reset occurs when $$f = f_o = \frac{\beta(1-f_i)}{\beta(1-f_i) + \gamma}$$

If at decision block 620 a determination is made that the color fills the batch, sub-process times β and γ are estimated from the batch processing time $z_k$, processing block 640, prior to computing $f_0$. In one embodiment, a Kalman filter (or linear quadratic estimation (LQE)) is implemented to perform the estimate. In such an embodiment, $z_k + w_k = H_k$ $[x_k + v_k]$; $H_k = [B \ n_{Interp} \ n_{Coll}]$; and $f_i = n_{Interp}/B$, where B is the batch size as previously defined, $w_k$ is measurement noise, $v_k$ is process noise, $n_{Coll}$ is the number of collisions in the current batch, and $n_{Interp}$ is the number of interpolations in the current batch. In one embodiment, the system state variable x is [α β γ]' and in another embodiment x is [α β γ ρ]', where the prime symbol (') means transpose; α is a fixed overhead processing time, ρ is the hash table reset time, β and γ are as previously defined, k is the batch index, and H is the process-to-measurement transformation, which is known as soon as a batch of colors have been processed.

In the embodiment where x is [α β γ ρ]', $H_k = [B \ n_{Interp} \ n_{Coll} \ n_{Reset}]$ instead of the value given above, where $n_{Reset}$ is the number of hash table resets that occurred during the currently processed batch. In another embodiment, two different Kalman filters with the two values of $H_k$ and x given above are run, depending on whether or not a hash table reset took place within the batch; and the more-frequently-run No-Reset filter is used to initialize the infrequently-run Reset Filter. In yet another embodiment, only the simpler, No Reset filter is used, and batches containing a hash table reset are not used to update the LQE. Thus, after iteration of the Kalman filter the updated state vector x together with $f_i$ are used to estimate the optimal fullness fraction.

Figure 7:
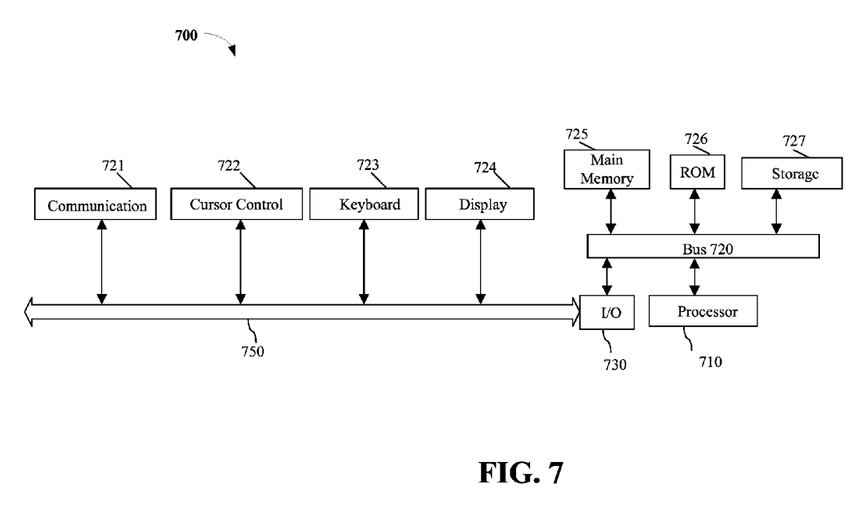

FIG. 7 illustrates a computer system 700 on which printing system 130 and/or print controller 140 may be implemented. Computer system 700 includes a system bus 720 for communicating information, and a processor 710 coupled to bus 720 for processing information.

Computer system 700 further comprises a random access memory (RAM) or other dynamic storage device 725 (referred to herein as main memory), coupled to bus 720 for storing information and instructions to be executed by processor 710. Main memory 725 also may be used for storing temporary variables or other intermediate information during execution of instructions by processor 710. Computer system 700 also may include a read only memory (ROM) and or other static storage device 726 coupled to bus 720 for storing static information and instructions used by processor 710.

A data storage device 725 such as a magnetic disk or optical disc and its corresponding drive may also be coupled to computer system 700 for storing information and instructions. Computer system 700 can also be coupled to a second I/O bus 750 via an I/O interface 730. A plurality of I/O devices may be coupled to I/O bus 750, including a display device 724, an input device (e.g., an alphanumeric input device 723 and or a cursor control device 722). The communication device 721 is for accessing other computers (servers or clients). The communication device 721 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A non-transitory machine-readable medium including data that, when accessed by a machine, cause the machine to reinitialize a color management hash table based on a hash table time and a interpolation time derived from concurrent real time measurements, including:
    determining whether an average time to search the hash table for an input color exceeds an average time to perform a multi-dimensional interpolation at a lookup table (LUT) to generate a corresponding output color; and
    reinitializing the hash table upon determining that the average time to search the hash table for an input color exceeds the average time to perform the multi-dimensional interpolation at the LUT.

2. The machine-readable medium of claim 1, including data that, when accessed by a machine, further cause the machine to:
   receive the input color;
   start a timer; and
   determine whether the input color is in the hash table.

3. The machine-readable medium of claim 2, including data that, when accessed by a machine, further cause the machine to:
   stop the timer upon a determination that the input color is in the hash table;
   incorporate the time to determine whether the input color is in the hash table to the average time to search the hash table; and
   generate the output color corresponding to the input color.

4. The machine-readable medium of claim 2, including data that, when accessed by a machine, further cause the machine to:
   stop the timer upon a determination that the input color is not in the hash table;
   incorporate the time to determine whether the input color is in the hash table to the average time to search the hash table;
   start a second timer; and
   perform the multi-dimensional interpolation at the LUT.

5. The machine-readable medium of claim 4, including data that, when accessed by a machine, further cause the machine to:
   stop the second timer after performing the multi-dimensional interpolation;
   add the time to the multi-dimensional interpolation to perform the multi-dimensional interpolation; and
   determine whether the average time to search the hash table exceeds the average time to perform the multi-dimensional interpolation.

6. The machine-readable medium of claim 5, including data that, when accessed by a machine, further cause the machine to determine whether the hash table is full.

7. The machine-readable medium of claim 5, including data that, when accessed by a machine, further cause the machine to:
   reinitialize the hash table upon a determination that the average time to search the hash table does exceeds the average time to perform the multi-dimensional interpolation;
   add the input color to the hash table; and
   generate the output color corresponding to the input color.

8. The machine-readable medium of claim 1, wherein the hash table is reinitialized upon determining that the hash table has reached an optimal fullness.

9. The machine-readable medium of claim 8, including data that, when accessed by a machine, further cause the machine to:
   receive the input color;
   start a timer; and
   determine whether the input color is in the hash table.

10. The machine-readable medium of claim 9, including data that, when accessed by a machine, further cause the machine to:
    stop the timer upon a determination that the input color is in the hash table;
    generate the output color corresponding to the input color.

11. The machine-readable medium of claim 8, including data that, when accessed by a machine, further cause the machine to:
    determine whether the hash table has reached optimal fullness upon a determination that the input color is not in the hash table;
    perform the multi-dimensional interpolation at the LUT upon a determination that the hash table has not reached optimal fullness; and
    add the input color to the hash table;
    stop the timer;
    estimate the probability of fullness of the hash table; and
    generate the output color corresponding to the input color.

12. The machine-readable medium of claim 11, including data that, when accessed by a machine, further cause the machine to reinitialize the hash table upon a determination that the hash table has reached optimal fullness.

13. The machine-readable medium of claim 10, wherein estimating the optimal fullness comprises:
    adding data to a current batch count;
    determining whether a batch is full; and
    computing the optimal fullness upon a determination that the batch is full.

14. The machine-readable medium of claim 13, including data that, when accessed by a machine, further cause the machine to estimate sub-process times upon a determination that the batch is full.

15. The machine-readable medium of claim 14, wherein the estimate sub-process times are estimated via a Kalman filter.

16. The machine-readable medium of claim 13, wherein the data comprises a processing time, a hash table collision count and an interpolation count.

17. A printing system comprising:
    a color management unit, including:
    a hash table to store input colors and corresponding output colors; and
    a lookup table (LUT); and
    one or more processors to reinitialize the hash table based on a hash table time and a interpolation time derived from concurrent real time measurements, including determining whether an average time to search the hash table for an input color exceeds an average time to perform a multi-dimensional interpolation at a lookup table (LUT) to generate a corresponding output color and reinitializing the hash table upon determining that the average time to search the hash table for an input color exceeds the average time to perform the multi-dimensional interpolation at the LUT;
    wherein the hash table is reinitialized upon determining that an average time to search the hash table for an input color exceeds an average time to perform a multi-dimensional interpolation at a lookup table (LUT) to generate a corresponding output color.

18. The printing system of claim 17, further comprising:
    one or more timers; and
    an estimation unit to calculate an optimal fullness for the hash table,
    wherein the hash table is reinitialized upon determining that the hash table has reached an optimal fullness.

* * * * *